United States Patent [19]

Ogino et al.

[11] Patent Number: 4,863,817
[45] Date of Patent: Sep. 5, 1989

[54] NONAQUEOUS ELECTROLYTE CELL

[75] Inventors: Takao Ogino, Tokorozawa; Tadaaki Miyazaki, Higashiyamato; Takahiro Kawagoe, Tokorozawa; Masaki Yoshio, Saga, all of Japan

[73] Assignee: Bridgestone Corporation, Tokyo, Japan

[21] Appl. No.: 257,323

[22] Filed: Oct. 13, 1988

[30] Foreign Application Priority Data

Oct. 13, 1987 [JP] Japan ............... 62-256220
Jun. 30, 1988 [JP] Japan ............... 63-163593

[51] Int. Cl.$^4$ ............... H01M 4/50
[52] U.S. Cl. ............... 429/194; 429/224; 204/96
[58] Field of Search ............... 429/194, 224; 204/96

[56] References Cited

U.S. PATENT DOCUMENTS

| 3,856,576 | 12/1974 | Prieto | 429/224 |
| 3,900,385 | 8/1975 | Emoto | 204/96 |
| 4,549,943 | 10/1985 | Mellors | 204/96 |
| 4,604,336 | 8/1986 | Nardi | 429/194 |

FOREIGN PATENT DOCUMENTS 72-09170 4/1972 Japan ............... 429/224

Primary Examiner—Donald L. Walton
Attorney, Agent, or Firm—Oblon, Spivak, McClelland, Maier & Neustadt

[57] ABSTRACT

In a nonaqueous electrolyte cell comprising a positive electrode, a negative electrode, and a nonaqueous electrolyte containing an alkali metal ion, an electrolytic manganese dioxide which is prepared by subjecting a manganese dioxide-forming electrolytic solution to electrolysis while introducing a gas therein is used as an active material for the positive electrode.

10 Claims, 3 Drawing Sheets

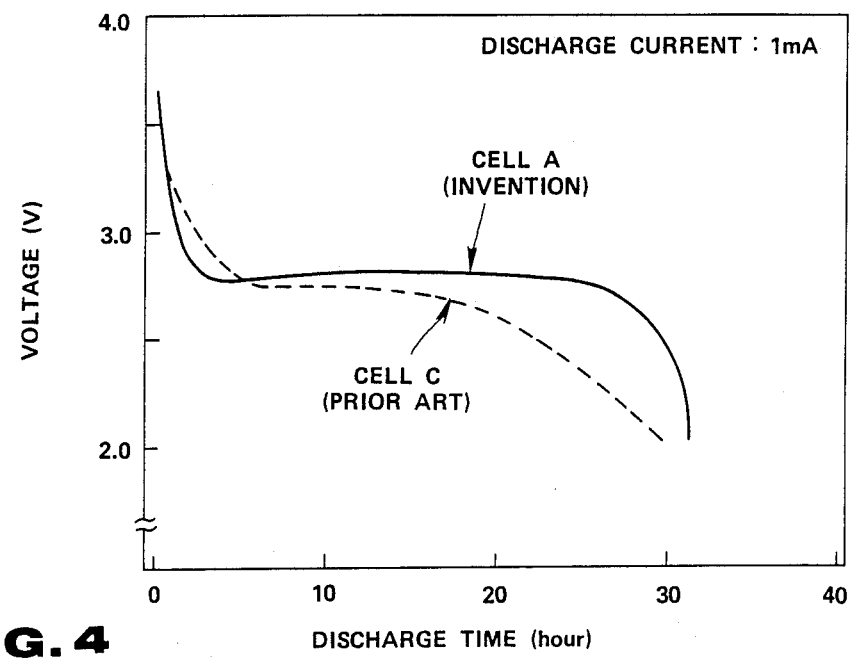
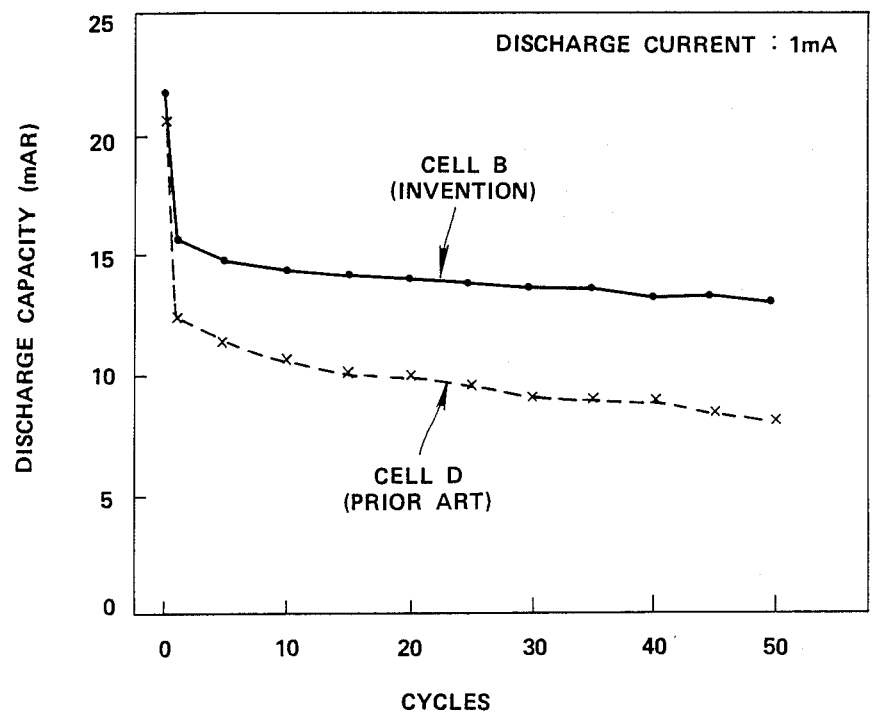

NONAQUEOUS ELECTROLYTE CELL

BACKGROUND OF THE INVENTION

1. Field of the Invention

This invention relates to a nonaqueous electrolyte cell having a high electric capacity, a high voltage and improved charge-discharge cycle performance.

2. Prior Art

For nonaqueous electrolyte cells having alkali light metals such as lithium and sodium as a negative electrode active material, it is well known in the battery art to use metal oxides, halides and sulfides as a positive electrode active material. Most of commercially available primary cells currently use manganese dioxide or carbon fluoride as a positive electrode active material.

A number of proposals have also been made for rechargeable secondary cells. For lithium secondary cells, for example, compounds having improved cycle performance of occluding and releasing lithium ion are used as the positive electrode active material, for example, metal compounds such as titanium sulfide, molybdenum sulfide, and vanadium oxide and electroconductive polymeric materials such as polyaniline. It is also proposed to use as the negative electrode active material alloys of lithium and aluminum or another metal capable of forming with lithium an alloy, typically a fusible alloy, principally for the purpose of avoiding a shortcircuit problem caused by dendrite growth from metallic lithium used alone. Some secondary cells are now commercially available which use a particular combination of positive and negative electrodes as mentioned above.

Although a variety of materials are available as the positive electrode active material, manganese dioxide among others is expected to be applicable as the positive electrode active material to secondary cells s well as nonaqueous electrolyte primary cells because of its advantages of economy, chemical stability and high voltage.

The manganese dioxide, however, has many drawbacks at the same time. For example, primary cells based on manganese dioxide show poor flatness of discharge voltage irrespective of a somewhat higher discharge voltage as compared with carbon fluoride. When the cell is used in an equipment to be operated at a relatively high voltage, the cell fails to afford a necessary voltage at a later stage of discharge, resulting in a low energy capacity.

The manganese dioxide has the following problems when applied to secondary cells in which charge-discharge operation is repeated. In the case of lithium secondary cells, for example, manganese dioxide can occlude lithium ions between layers thereof upon discharge to convert into a material represented by $Li_xMnO_2$ where $0 \leq x \leq 1$ so that it can take in at most 1 mol of lithium ion per mol of $MnO_2$. Charging induces reaction of releasing lithium atoms. However, the charging reaction does not proceed to a full extent that the lithium atoms occluded be completely released upon charging, leaving 0.3 to 0.5 mol of lithium in the manganese dioxide. There are present 0.3 to 0.5 mol of dead lithium atoms. The dead lithium atoms mean that they are in an electrochemically unchargeable state. In charge-discharge cycles, the cell shows a substantially reduced capacity retentivity in the second cycle as compared with the initial capacity. Since the amount of inactive lithium gradually increases with the subsequent cycles, the so-called coulomb efficiency lowers and the capacity continues reducing. These problems throw doubt on the adequacy of manganese dioxide to secondary cells.

Many attempts have been made to solve the problems as by controlling conditions of a synthetic process and a subsequent heat treatment so as to optimize the crystalline structure and grain size of manganese dioxide. These methods have not been fully successful.

SUMMARY OF THE INVENTION

An object of the present invention is to provide a nonaqueous electrolyte cell having a positive electrode active material in the form of manganese dioxide which exhibits improved discharge voltage flatness, a high capacity, and improved cycle performance.

According to the present invention, there is provided a nonaqueous electrolyte cell comprising a positive electrode, a negative electrode, and a nonaqueous electrolyte containing an alkali metal ion, wherein an electrolytic manganese dioxide which is prepared by subjecting a manganese dioxide-forming electrolytic solution to electrolysis while introducing a gas therein is used as an active material for the positive electrode.

BRIEF DESCRIPTION OF THE DRAWINGS

The above and other objects, features, and advantages of the present invention will be better understood from the following description taken in conjunction with the accompanying drawings, in which:

FIG. 3 is a diagram showing the discharge curves of nonaqueous electrolyte primary cells using manganese dioxides prepared by a prior art method and the present method; and FIG. 4 is a diagram showing the change of capacity with charge/discharge cycles of nonaqueous electrolyte secondary cells using manganese dioxides prepared by a prior art method and the present method.

DETAILED DESCRIPTION OF THE INVENTION

The manganese dioxide commonly used in battery applications is generally classified into naturally occurring manganese dioxide (NMD), chemically synthesized manganese dioxide (CMD), and electrolytically formed manganese dioxide (EMD). Among them, electrolytic manganese dioxide is most often used in nonaqueous electrolyte cells because of productivity, cost and discharge performance. Although various electrolytic processes are employable, it is most efficient and economic to prepare manganese dioxide by a so-called slurry process comprising suspending manganese oxide in an electrolytic solution of manganese sulfate and electrolyzing the slurry. We have attempted to prepare manganese dioxide by electrolyzing an electrolytic solution such as a manganese sulfate-sulfuric acid solution while introducing a gas such as nitrogen therein. We have found that the resulting manganese dioxide can be applied as a positive electrode active material to form a nonaqueous electrolyte cell which has improved discharge voltage flatness and an increased discharge capacity in a relatively high voltage region, and shows improved charge-discharge cycle performance when constructed as a secondary cell.

Figure 1:
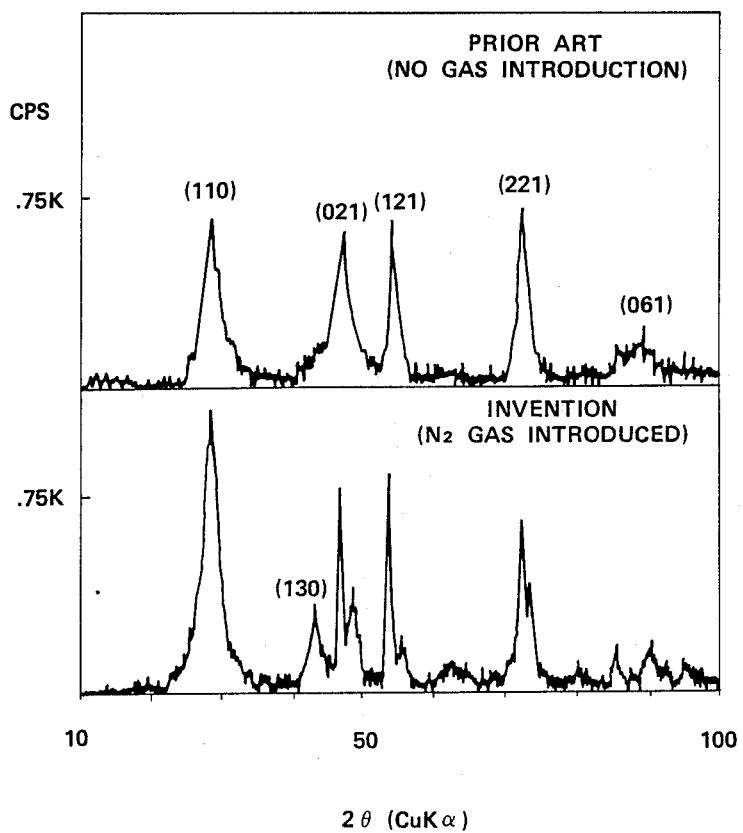
FIG. 1 is a diagram showing the X-ray diffraction patterns of an electrolytic manganese dioxide prepared by a prior art method without $N_2$ gas introduction and an electrolytic manganese dioxide prepared by the present method involving $N_2$ gas introduction.

We ave not fully understood why the thus prepared electrolytic manganese dioxide exhibits excellent properties as a positive electrode active material. The manganese dioxide prepared through electrolysis of a solution into which a gas like nitrogen is introduced is substantially different in crystalline structure from that prepared by the commonly used slurry process. The difference in crystalline structure is deemed to contribute to the excellent properties. FIG. 1 shows the X-ray diffraction patterns of the manganese dioxide prepared by introducing nitrogen gas and the common manganese dioxide prepared without introducing nitrogen gas. The former has very high crystallinity as evidenced by the substantial development of (110) face. The axial length of $a_0$, $b_0$ and $c_0$ axes of a rhombic crystal was calculated from the lattice spacings of (110), (021) and (211) to find that the introduction of nitrogen gas has changed the configuration such that the b0 axis is shortened from 10.2 Å to 9.5 Å and the $c_0$ axis is stretched from 2.72 Å to 2.80 Å while the $a_0$ axis remains unchanged. In addition to the high degree of crystallinity mentioned above, the manganese dioxide has a tunnel structure which facilitates passage of alkali metal ions during occlusion and release process The improvement in cell properties is attributable to these features.

The present invention is directed to a nonaqueous electrolyte cell comprising a positive electrode, a negative electrode, and a nonaqueous electrolyte containing an alkali metal ion. According to the present invention, the cell has a positive electrode active material in the form of an electrolytic manganese dioxide which is prepared by electrolyzing a manganese dioxide-forming electrolytic solution while introducing a gas therein.

The electrolytic manganese dioxide used herein is described in further detail. The electrolytic solution and conditions are not critical in the preparation of manganese dioxide and may be selected from any commonly used solutions and conditions. Preferred electrolytic solutions are commonly used solutions of manganese sulfate and sulfuric acid, most preferably solutions of manganese sulfate and sulfuric acid having suspended therein a manganese oxide such as manganese dioxide. The concentration of manganese sulfate and sulfuric acid may be within commonly used ranges and the manganese oxide may be added in a commonly used amount. Preferably, manganese sulfate may be present in an amount of about 0.1 to about 10 moles per liter, sulfuric acid may be present in an amount of about 0.05 to about 5 moles per liter, and manganese oxide may be present in an amount of about 0.01 to about 5 grams per liter.

As to the electrolytic conditions, an anodic current density of about 5 to about 50 mA/cm$^2$, preferably about 20 to about 30 mA/cm2 is preferred. The temperature preferably ranges from about 80° C to the boiling point of the solution. An anode of titanium and a cathode of graphite are preferred.

The manganese dioxide used herein is prepared by electrolyzing an electrolytic solution under conditions as described above while introducing a gas into the solution. The gas used herein may be one member selected from nitrogen, oxygen, argon, helium, air, acetylene, and hydrogen and a mixture of any two or more of these gases. Nitrogen gas is most preferred. The gas may preferably be introduced into the electrolytic solution at a rate of from about 2 to about 100 ml/min., preferably from about 10 to about 40 ml/min. per liter of the solution.

The thus obtained manganese dioxide has a high degree of crystallinity as previously described and excellent properties as a positive electrode active material. Most preferred is the electrolytic manganese dioxide in which the intensity or peak height of (110) face in X-ray diffraction is at least 1.1 times that of the manganese dioxide prepared by a prior art method without gas introduction.

The nonaqueous electrolyte cell of the present invention may be constructed as either a primary cell or a secondary cell. The electrolytic manganese dioxide is used as a positive electrode active material to form a positive electrode by a conventional process as by adding a conductive aid such as acetylene black and a binder such as powder fluoride resin thereto.

Any desired negative electrode may be selected depending on the particular application of the cell. Preferably, lithium metal capable of offering a high voltage and a high energy capacity ay be used in primary cells whereas lithium-aluminum alloys having excellent charge-discharge properties may be used in secondary cells. Of course, the negative electrode of secondary cells is not limited to the lithium-aluminum alloys. For example, alloys of lithium with one or more of magnesium, indium, mercury, zinc, cadmium, lead, bismuth, tin, and antimony may be used with good results.

Any desired electrolyte may be used to constitute the cell of the present invention. It may be selected from electrolytes commonly used in prior art cells. Preferably one or more electrolytes selected from LiClO$_4$, LiBF$_4$, LiAsF$_6$, LiSO$_3$CF$_3$ and LiPF$_6$ may be used when the negative electrode is of lithium or lithium alloy.

The electrolytes are generally used as solutions thereof dissolved in solvents. The type of solvent is not particularly limited although preferred are relatively highly polar solvents. Examples of the solvents include propylene carbonate, ethylene carbonate, tetrahydrofuran, 2-methyltetrahydrofuran, dioxolane, dioxane, dimethoxyethane, glymes such as diethyleneglycol dimethyl ether, lactones such as $\gamma$-butyrolactone, phosphate esters such as triethylphosphate, borate esters such as triethyl borate, sulfur compounds such as sulfolane and dimethylsulfoxide, nitriles such as acetonitrile, amides such as dimethylformamide and dimethylacetamide, dimethyl sulfate, nitromethane, nitrobenzene, and dichloroethane, and mixtures thereof. Preferred are ethylene carbonate, propylene carbonate, butylene carbonate, tetrahydrofuran, 2-methyltetrahydrofurane, dimethoxyethane, dioxolane, and $\gamma$-butyrolactone, and mixtures thereof.

The electrolytes used in the cell of the present invention may also be solid electrolytes. They include organic solid electrolytes which are obtained by impregnating such polymers as polyethylene oxide, polypropylene oxide, isocyanate-crosslinked polyethylene oxide, and phosphazine polymer having an ethylene oxide oligomer side chain with the above-mentioned electrolyte compounds; and inorganic solid electrolytes, for example, inorganic ion conductors such as Li$_3$N and LiBCl$_4$ and lithium glass species such as Li$_4$SiO$_4$ and Li$_3$BO$_3$.

The cell of the present invention is generally constructed by interposing the electrolyte between the positive and negative electrodes. A separator may be interposed between the positive and negative electrodes in order to prevent the electrodes from contacting each other to cause current shortcircuit. The separator is preferably a porous material which can be impregnated with and allow passage of the electrolyte, for example, woven and non-woven fabrics, porous members and nets of synthetic resins such as polytetrafluoroethylene, polypropylene and polyethylene.

As described above, the nonaqueous electrolyte cell of the present invention uses as a positive electrode active material an electrolytic manganese dioxide which is prepared by electrolyzing a manganese dioxide-forming electrolytic solution, typically a manganese sulfate-sulfuric acid electrolytic solution while introducing a gas, typically nitrogen therein, and hence has an improved crystalline structure. The cell has improved discharge voltage flatness and an increased discharge capacity in a relatively high voltage region. The cell characterized by a high capacity and a high voltage further exhibits improved charge-discharge cycle performance when constructed as a secondary cell.

EXAMPLES

Examples of the present invention are given below by way of illustration and not by way of limitation.

EXAMPLE

An electrolytic apparatus was constructed by providing an electrolytic tank having an interior volume of 10 liters with a heater, placing an alternate array of titanium plates as anode and graphite plates as cathode in the tank, and extending a gas feed pipe on the bottom of the tank. A manganese dioxide-forming electrolytic solution was admitted into the tank, which was prepared by suspending 0.2 gram/liter of electrolytic manganese dioxide in a mixture of 1 mol of $MnSO_4$ and 0.4 mol of $H_2SO_4$. While nitrogen gas was introduced at a flow rate of 30 ml/min. into the solution through the gas feed pipe, electrolytic manganese dioxide was prepared by conducting electricity to effect electrolysis under the following conditions.

Solution temperature: $95 \pm 1°$ C.
Current density: 5 $mA/cm^2$
Electrolysis time: 75 hours At the end of electrolysis, the deposit on the anode was washed with water, dried at 110° C. for 2 hours, passed through a screen of 200 mesh, and then baked at 350° C. for 10 hours.

A nonaqueous electrolyte cell was fabricated using the thus obtained electrolytic manganese dioxide as a positive electrode active material. To 100 parts by weight of the manganese dioxide powder were added 20 parts by weight of acetylene black conductive aid and 10 parts by weight of fluoride resin binder. The mixture was throughly blended, milled with an organic solvent, and rolled into a sheet having a thickness of about 400μm. The sheet was dried in vacuum at 150° C. and then punched into a disk having a predetermined diameter which was used as a positive electrode.

A nonaqueous electrolyte primary cell designated A was constructed using as the negative electrode a disk of lithium metal punched to a predetermined size.

A nonaqueous electrolyte secondary cell designated B was constructed using a negative electrode of lithium-aluminum alloy. The lithium-aluminum alloy plate was prepared by punching an aluminum plate to a predetermined size, cladding lithium to the aluminum disk under pressure, and processing the lithium-clad aluminum disk in an electrolytic solution to form a lithium-aluminum alloy having a lithium content of 30 atom%.

The electrolyte for both the primary and secondary cells was a mixture of propylene carbonate and dimethoxyethane in a volume ratio of 1:1 having 1 mol/liter of lithium perchlorate ($LiClO_4$) dissolved therein.

Figure 2:
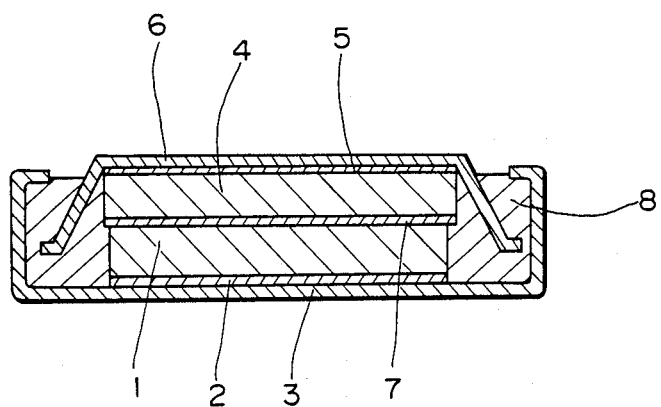
FIG. 2 is a cross-sectional view of a cell used in an example.

The cells A and B had the structure shown in FIG. 2. The cell shown in FIG. 2 includes a positive electrode 1, a current collector 2 of stainless steel for the positive electrode, and a positive casing 3. The positive electrode 1 and the collector 2 are united together and the collector 2 is spot welded to the inside surface of the positive casing 3. The cell further includes a negative electrode 4, a current collector 5 of stainless steel for the negative electrode, and a negative casing 6. The negative electrode 4 is spot welded to the collector 5 which is secured to the inside surface of the negative casing 6. A separator 7 of polypropylene nonwoven fabric which is impregnated with the above-mentioned electrolyte is interposed between the positive and negative electrodes 1 and 4. The positive and negative casing 3 and 6 are assembled through an insulating gasket 8. The cell has a diameter of 20.0 mm and a thickness of 1.6 mm.

The primary cell A was subjected to a discharge test by allowing the cell to discharge at a current of 1 mA until the voltage reached 2 volts. The discharge curve is shown in FIG. 3.

The secondary cell B was repeatedly charged and discharged for 50 cycles at a current of 1 mA with a discharge terminating voltage of 1.5 volts and a charge terminating voltage of 3.0 volts, determining a change of capacity with cycles. The results are shown in FIG. 4.

Comparative Example

Electrolytic manganese dioxide was prepared by the same procedure as in Example except that nitrogen gas was not introduced during electrolysis. A positive electrode was prepared from this electrolytic manganese dioxide by the same procedure as in Example. Using the same negative electrode and electrolyte as in Example, a nonaqueous electrolyte primary cell C and a nonaqueous electrolyte secondary cell D were constructed.

The primary cell C was subjected to a discharge test by allowing the cell to discharge at a current of 1 mA until the voltage reached 2 volts. The discharge curve is shown in FIG. 3.

The secondary cell D was repeatedly charged and discharged for 50 cycles at a current of 1 mA with a discharge terminating voltage of 1.5 volts and a charge terminating voltage of 3.0 volts. The change of capacity with cycles is shown in FIG. 4.

As seen from FIG. 3 relating to nonaqueous electrolyte primary cells, the cell A of the present invention has significantly improved voltage flatness. As compared with the prior art cell C, the discharge capacity of cell A is substantially equal at the discharge terminating voltage of 2 V, but is increased about 30% when the discharge terminating voltage is set at 2.5 V.

The retentivity of capacity of a cell at a certain cycle relative to the initial capacity is calculated from FIG. 4 relating to nonaqueous electrolyte secondary cells. At the second cycle, the cell B of the present invention had a retentivity of 75% whereas the prior art cell D had a retentivity of 58%. At the 50th cycle, the cell B had a retentivity of 59% whereas the prior art cell D had a retentivity of 37%. The present cell experienced a smaller capacity reduction both at the 2nd and 50th cycles. It is observed that the electrolytic manganese dioxide of the present invention has significantly improved charge-discharge performance.

What we claim:

1. In a nonaqueous electrolyte cell comprising a positive electrode, a negative electrode, and a nonaqueous electrolyte containing an alkali metal ion, the improvement wherein an electrolytic manganese dioxide which is prepared by subjecting a manganese dioxide-forming electrolytic solution to electrolysis while introducing a gas therein is used as an active material for the positive electrode.

2. The cell of claim 1 wherein the solution is a solution containing manganese sulfate and sulfuric acid.

3. The cell of claim 2 wherein the solution has a manganese oxide suspended therein.

4. The cell of claim 1 or 2 wherein the electrolysis is carried out at an anodic current density of from about 5 to about 50 mA/cm$^2$ and a temperature of at least 80° C.

5. The cell of claim 1 or 2 wherein the gas is at least one member selected from the group consisting of nitrogen, oxygen, argon, helium, air, acetylene, and hydrogen.

6. The cell of claim 5 wherein the gas is nitrogen.

7. The cell of claim 5 wherein the gas is introduced at a flow rate of about 2 to 100 ml/min. per liter of the solution.

8. The cell of claim 1 which is a primary cell wherein the negative electrode comprises metallic lithium.

9. The cell of claim 1 which is a secondary cell wherein the negative electrode comprises a lithium-aluminum alloy.

10. The cell of claim 8 or 9 wherein the electrolyte comprises at least one member selected from the group consisting of LiClO$_4$, LiBF$_4$, LiAsF$_6$, LiSO$_3$CF$_3$ and LiPF$_6$.

* * * * *